3,404,961
PROCESS FOR THE RECOVERY OF CARBON
DISULFIDE FROM TRITHIANE
Hans-Dieter Rupp, Erlenbach, Erhard Siggel, Maihohl, and Gerhard Meyer, Obernburg, Germany, assignors to Vereinigte Glanzstoff-Fabriken AG., Wuppertal-Elberfeld, Germany
No Drawing. Filed Mar. 29, 1966, Ser. No. 538,229
Claims priority, application Germany, Apr. 8, 1965,
V 28,223
5 Claims. (Cl. 23—206)

ABSTRACT OF THE DISCLOSURE

Recovery of carbon disulfide by heating trithiane at 1100–1500° C. in contact with activated carbon and collecting the resulting carbon disulfide in a cooled receiver. The process is useful in recovering and reusing carbon disulfide in the production of viscose rayon.

---

This invention is concerned with the recovery of carbon disulfide from trithiane, and more particularly, the invention provides a means of converting trithiane obtained as a precipitate in rayon spinning baths into carbon disulfide which can then be reused in the production of viscose rayon.

In the manufacture of viscose rayon, it is possible to use an aqueous spinning bath for regenerating the cellulose and forming filaments which contains formaldehyde in addition to sulfuric acid, sodium sulfate and in some cases other salts. During the spinning process, there is formed in the bath trithiane which is a cyclic trimeric thioformaldehyde of the formula:

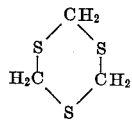

The trithiane precipitates in solid form in the aqueous spinning bath and can be separated therefrom by filtration. Trithiane is not itself useful in the production of rayon and is therefore considered to be a waste product of the spinning process. Over a period of time, this rejection of the trithiane constitutes a considerable economic loss in terms of the relatively large amounts in which this by-product accumulates.

The primary object of the present invention is to convert trithiane into carbon disulfide which can then be reutilized in the production of viscose rayon, i.e. in the xanthate stage of producing the viscose solution wherein alkali-cellulose is reacted with carbon disulfide.

Another object of the invention is to provide a relatively simple and economical process for the conversion of trithiane into carbon disulfide.

It has now been found that these and other objects and advantages can be achieved, in accordance with the present invention, by heating trithiane in contact with activated carbon at a temperature of about 1100° C. to 1500° C., preferably between about 1250° C. and 1300° C. and then collecting the resulting carbon disulfide in a cooled receiver. While it is possible to use any type of carbon for this reaction, the most effective results are achieved by using an activated carbon with an active surface area which is as large as possible. Especially good results in terms of high yields have been obtained by using charcoal which has been treated with sodium or potassium carbonate.

Such a treated charcoal is prepared by treating the charcoal with dilute aqueous solutions of sodium or potassium carbonate and removing the water. It is desirable that the charcoal contains about 3 percent by weight of sodium or potassium carbonate after this treatment. The carbon is preferably arranged as a fixed bed in the reaction zone, and the trithiane is introduced in gaseous state into the reaction zone over the carbon at temperatures between 1100° C. and 1500° C. for conversion into carbon disulfide. The carbon disulfide gas withdrawn from the reaction zone can be easily condensed for separation and recovery, e.g. in a cooled receiver or the like.

The process of the invention provides a direct conversion of the trithiane into carbon disulfide in yields of between 45% and 65%, with reference to the theoretical yield, depending upon the temperature. In general, the best yields are obtained at temperatures of about 1250–1300° C.

Hydrogen sulfide is also produced as a by-product of the reaction, being separated as a gaseous product from the liquid carbon disulfide in the cooled receiver, and can be readily converted into carbon disulfide by conventional processes. In this manner, it is possible to recover practically all of the total amount of sulfur bound in the trithiane waste product and convert it into the carbon disulfide needed for the production of rayon according to the viscose process. Especially advantageous results are achieved if the hydrogen sulfide by-product is mixed with air and then oxidized into sulfur on active carbon such as charcoal. This carbon coated with sulfur is then converted in known manner into carbon disulfide.

The process of the invention is further illustrated by the following example, it being understood that variations can be made in the reaction conditions by one skilled in this art without departing from the spirit or scope of the invention except as set forth in the appended claims.

EXAMPLE

A corundum tube is filled with 250 grams of charcoal which has been treated with an aqueous solution of sodium carbonate (3% by weight of $Na_2CO_3$ with reference to the carbon). This bed of active carbon is then heated to 1250–1300° C. and the temperature maintained in this range by means of electrical heating. Then 100 grams of trithiane are introduced into the reaction zone in gaseous state over the carbon. Carbon disulfide and hydrogen sulfide are removed as a gaseous mixture from the end of the tube, and the carbon disulfide is condensed and collected in a cooled receiver. There is initially obtained 53.7 grams of carbon disulfide, corresponding to a yield of 65% of the theoretical yield. The hydrogen sulfide resulting as a by-product is mixed with air and oxidized into sulfur on charcoal as the active carbon. This carbon coated with sulfur is then converted into carbon disulfide in a second corundum tube. This results in another 24.8 grams of the desired $CS_2$ product. The total yield of carbon disulfide thus amounts to 95% of the theoretical yield.

Similar results are achieved when using other forms of activated carbon, especially where the effective or active surface area is at least $2 \times 10^4$ cm.$^2$/gram. The process according to the invention can be readily adapted to the continuous regeneration of carbon disulfide from trithiane, e.g. by guiding the trithiane in gaseous form continuously through the reaction zone and continuously recovering and separating the gaseous products.

The conversion of trithiane into carbon disulfide according to this invention is particularly advantageous when used in combination with the overall process for the production of viscose rayon. Carbon disulfide is required in this known process for reaction with alkali-cellulose to form the so-called xanthate which is then ripened into a viscose spinning solution. The viscose is then spun into an acidic aqueous bath containing formaldehyde as well as sulfuric acid and other known components. Trithiane accumulating in this bath as a precipitate is filtered off and converted into carbon disulfide as described herein so as to achieve a yield of at least 90-95% of the theoretical yield. This carbon disulfide is then recycled for reaction with the alkali-cellulose in the production of the viscose solution. In this manner, it is possible to avoid the costly waste of carbon disulfide which has occurred in previous viscose spinning processes.

The invention is hereby claimed as follows:

1. A process for the recovery of carbon disulfide from trithiane which comprises heating said trithiane in contact with activated carbon at a temperature of about 110° C. to 1500° C., and collecting the resulting carbon disulfide in a cooled receiver.

2. A process as claimed in claim 1 wherein said trithiane is heated at a temperature between about 1250° C. and 1300° C.

3. A process as claimed in claim 1 wherein said activated carbon is charcoal which has been treated with a compound selected from the group consisting of sodium carbonate and potassium carbonate.

4. A process as claimed in claim 3 wherein said trithiane is heated at a temperature between about 1250° C. and 1300° C.

5. A process as claimed in claim 1 wherein the trithiane reactant is obtained as a by-product from the spinning of a viscose solution in an acidic aqueous spinning bath and the carbon disulfide is recycled for reaction with alkali-cellulose in the production of the viscose solution.

References Cited

UNITED STATES PATENTS

| | | | |
|---|---|---|---|
| 1,735,409 | 1/1928 | Pier et al. | 23—206 |
| 2,079,543 | 5/1937 | Bley | 23—206 |
| 2,459,907 | 1/1949 | Winslow | 23—1 X |
| 3,007,764 | 11/1961 | Gage | 264—170 |

FOREIGN PATENTS 949,952  11/1960  Great Britain.

OSCAR R. VERTIZ, *Primary Examiner.*

G. PETERS, *Assistant Examiner.*

UNITED STATES PATENT OFFICE
CERTIFICATE OF CORRECTION

Patent No. 3,404,961                                October 8, 1968

Hans-Dieter Rupp et al.

It is certified that error appears in the above identified patent and that said Letters Patent are hereby corrected as shown below:

Column 3, line 12, "110°" should read -- 1100° --.

Signed and sealed this 21st day of April 1970.

(SEAL)
Attest:

Edward M. Fletcher, Jr.                        WILLIAM E. SCHUYLER, JR.
Attesting Officer                                 Commissioner of Patents